US012807226B2

(12) United States Patent
Van Thiel et al.

(10) Patent No.: US 12,807,226 B2
(45) Date of Patent: Nov. 24, 2026

(54) KINK ANGLE SENSOR ARRANGEMENT, VEHICLE COMBINATION, AND METHOD FOR FORMING THE VEHICLE COMBINATION

(71) Applicant: ZF CV Systems Global GmbH, Bern (CH)

(72) Inventors: Julian Van Thiel, Großburgwedel (DE); Klaus Plähn, Seelze (DE)

(73) Assignee: ZF CV SYSTEMS GLOBAL GMBH, Bern (CH)

( * ) Notice: Subject to any disclaimer, the term of this patent is extended or adjusted under 35 U.S.C. 154(b) by 134 days.

(21) Appl. No.: 18/967,693

(22) Filed: Dec. 4, 2024

(65) Prior Publication Data

US 2025/0187662 A1 Jun. 12, 2025

(30) Foreign Application Priority Data

Dec. 6, 2023 (DE) ..................... 10 2023 134 088.3

(51) Int. Cl.
*B62D 15/02* (2006.01)
*B60D 1/64* (2006.01)
*B62D 53/08* (2006.01)

(52) U.S. Cl.
CPC ............. *B62D 15/023* (2013.01); *B60D 1/64* (2013.01); *B62D 53/08* (2013.01); *B62D 53/0842* (2013.01)

(58) Field of Classification Search
None
See application file for complete search history.

(56) References Cited

U.S. PATENT DOCUMENTS 6,223,114 B1 * 4/2001 Boros ................. B60T 8/17552 701/72
6,283,315 B1 * 9/2001 Willim .................... B66C 23/76 212/196
7,637,512 B1 * 12/2009 McGhie .................... B60P 1/54 280/411.1
(Continued)

FOREIGN PATENT DOCUMENTS

AT 514448 A1 1/2015
DE 19964045 A1 7/2001
(Continued)

*Primary Examiner* — Fekadeselassie Girma
(74) *Attorney, Agent, or Firm* — LEYDIG, VOIT & MAYER, LTD.

(57) ABSTRACT

A kink angle sensor arrangement for a vehicle combination includes a connecting element with a longitudinal center axis, a first articulation piece on the connecting element, and a second articulation piece for connection to a towing or towed vehicle. The first articulation piece is configured to be mounted rotatably on the second articulation piece such that the first articulation piece can twist about a second axis of rotation with respect to the second articulation piece. The arrangement includes a first coupling piece configured to be detachably mechanically connected to a second coupling piece to prevent twisting of the first coupling piece with respect to the second coupling piece, and a sensor system configured to detect a rotated position and/or a rotational movement of the first articulation piece, and to generate and output a sensor signal characterizing the rotated position and/or the rotational movement of the first articulation piece.

11 Claims, 3 Drawing Sheets

(56) References Cited

U.S. PATENT DOCUMENTS

| | | | | |
|---|---|---|---|---|
| 7,971,894 | B2 * | 7/2011 | Staude | B62D 53/0842 280/432 |
| 2007/0193795 | A1 * | 8/2007 | Forsyth | B60L 50/50 180/65.285 |
| 2011/0049075 | A1 * | 3/2011 | Willim | B66C 23/74 212/196 |
| 2018/0057052 | A1 * | 3/2018 | Dodd | B62D 15/023 |
| 2019/0016264 | A1 * | 1/2019 | Potnis | B60D 1/245 |
| 2019/0118859 | A1 | 4/2019 | Ghannam et al. | |
| 2020/0361397 | A1 * | 11/2020 | Joseph | B60D 1/06 |
| 2021/0039459 | A1 * | 2/2021 | Köster | B60D 1/62 |
| 2021/0171100 | A1 * | 6/2021 | Wulf | B60D 1/245 |
| 2021/0300136 | A1 * | 9/2021 | Algüera | B60D 1/64 |
| 2022/0017162 | A1 * | 1/2022 | Clauer | B60D 1/62 |
| 2022/0306014 | A1 * | 9/2022 | Sefati | B60R 11/04 |
| 2023/0356794 | A1 * | 11/2023 | Rust | B60K 1/04 |
| 2024/0132169 | A1 * | 4/2024 | Saupe | B62D 53/04 |
| 2024/0210168 | A1 * | 6/2024 | Record | G01S 17/931 |
| 2024/0217285 | A1 * | 7/2024 | Barth | B60D 1/36 |
| 2024/0336352 | A1 * | 10/2024 | Poe | B64C 25/001 |
| 2024/0343384 | A1 * | 10/2024 | Bell | B64C 25/12 |

FOREIGN PATENT DOCUMENTS

| | | | |
|---|---|---|---|
| DE | 202011003521 | U1 | 6/2011 |
| DE | 102015103972 | A1 | 10/2015 |
| DE | 102016012663 | A1 | 6/2017 |
| DE | 102018125950 | A1 | 4/2019 |
| DE | 102020004837 | A1 | 10/2020 |

* cited by examiner

KINK ANGLE SENSOR ARRANGEMENT, VEHICLE COMBINATION, AND METHOD FOR FORMING THE VEHICLE COMBINATION

CROSS REFERENCE TO RELATED APPLICATIONS

This application claims benefit to German Patent Application No. DE 10 2023 134 088.3, filed on Dec. 6, 2023, which is hereby incorporated by reference herein.

FIELD

The invention relates to a kink angle sensor arrangement for ascertaining a kink angle between a towed vehicle and a towing vehicle, to a vehicle combination with such a kink angle sensor arrangement, and to a method for forming such a vehicle combination.

BACKGROUND

In commercial vehicles which are operated with a relatively high degree of automation, information about a kink angle between a towing vehicle, for example the tractor or semitrailer tractor, and the towed vehicle, for example a semitrailer or a dolly, is necessary to plan, for example, a target trajectory and/or to automatedly control a movement of the semitrailer truck, in particular when reversing. In order to obtain such information about the kink angle, current concepts envisage in particular a kink angle sensor arrangement which is arranged separately on a fifth-wheel plate on the towing vehicle, or which is integrated into the fifth-wheel plate.

This is described, for example, in DE 199 64 045 A1, according to which the kingpin of a semitrailer is magnetized or is connected to a permanent magnet and the swiveling of the trailer is detected via a magnetic field sensor on the semitrailer tractor, situated in the vicinity of the kingpin. A similar solution is described in DE 10 2020 004 837 A1.

In addition to a high degree of complexity, there is the significant disadvantage that an offset compensation is required in order to determine a “zero position” or “reference position” or starting position, i.e. the kink angle during “defined straight-line driving”. Direct reversing after coupling has been effected is accordingly, for example, impossible or possible only in certain conditions.

It is furthermore described in DE 10 2018 125 950 A1 to pretension a plate-like body, which is fixed to the towing vehicle and has a plurality of sensors arranged in an array or grid, against a drawbar as a coupling element fixed to the trailer. The sensors detect contact with the coupling element fixed to the trailer, wherein the coupling element fixed to the trailer contacts a different number of sensors depending on the kink angle such that a kink angle can be deduced by a corresponding signal evaluation.

It is furthermore described in DE 10 2015 103 972 A1 to connect a connecting element on one side to a drawbar of a trailer via a magnet as a coupling piece, and on the other side to an element mounted rotatably on the vehicle in the axis of rotation of the ball head as an articulation piece which has a magnetic part. The rotation of the element can here be detected via a magnetic field sensor which is below the ball head and detects the magnetic field of the magnetic part on the rotatably mounted element such that a kink angle can be deduced therefrom.

Optical methods are furthermore known which are based on the evaluation of camera images. Thus, the contours of the trailer or towing vehicle are detected, for example, via laser systems or cameras and the kink angle is estimated based on optical evaluation methods. A disadvantage here is that these systems have a high sensitivity to dirt and a limited measurement range (<) 45° and limited measurement accuracy (>=1°). In addition, they are dependent on and sensitive to the ambient light.

SUMMARY

In an embodiment, the present disclosure provides a kink angle sensor arrangement for a vehicle combination including a towing vehicle with a first longitudinal center axis and a towed vehicle with a second longitudinal center axis, wherein the kink angle sensor arrangement can be arranged between the towing vehicle and the towed vehicle, in order to ascertain a kink angle between the towing vehicle and the towed vehicle. The kink angle sensor arrangement comprises a connecting element with a third longitudinal center axis, a first articulation piece on a first side of the connecting element, and a second articulation piece for connection to the towing vehicle or to the towed vehicle. The first articulation piece is configured to be mounted rotatably on the second articulation piece such that the first articulation piece can twist about a second axis of rotation with respect to the second articulation piece. The kink angle sensor arrangement further comprises a first coupling piece on a second side of the connecting element and a second coupling piece configured to connect to the towed vehicle when the second articulation piece is connected to the towing vehicle, or to connect to the towing vehicle when the second articulation piece is connected to the towed vehicle. The first coupling piece is configured to be detachably mechanically connected to the second coupling piece, such that twisting of the first coupling piece with respect to the second coupling piece is prevented. The kink angle sensor arrangement further comprises a sensor system configured to detect a rotated position and/or a rotational movement of the first articulation piece about the second axis of rotation, and to generate and output a sensor signal. The sensor signal characterizes the rotated position and/or the rotational movement of the first articulation piece about the second axis of rotation.

BRIEF DESCRIPTION OF THE DRAWINGS

Subject matter of the present disclosure will be described in even greater detail below based on the exemplary figures. All features described and/or illustrated herein can be used alone or combined in different combinations. The features and advantages of various embodiments will become apparent by reading the following detailed description with reference to the attached drawings, which illustrate the following.

DETAILED DESCRIPTION

Figure 1:
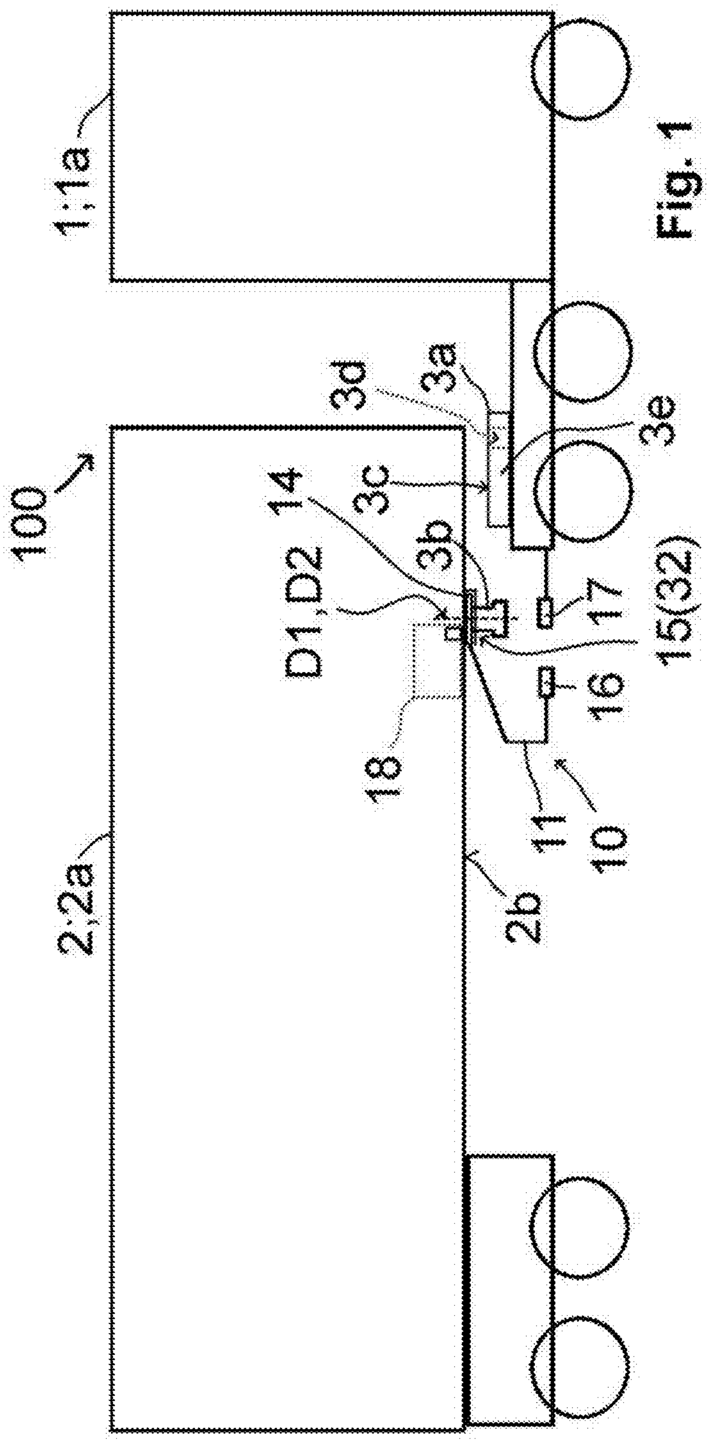
FIG. 1 shows a schematic view of a vehicle combination.

In an embodiment, the present invention provides a kink angle sensor arrangement and a vehicle combination by means of which a kink angle between a towed vehicle and a towing vehicle can be ascertained automatedly in a simple and reliable fashion. A method for forming the vehicle combination with the kink angle sensor arrangement is also provided.

According to an embodiment of the invention, a kink angle sensor arrangement is provided for a vehicle combination comprising a towing vehicle with a first longitudinal center axis and a towed vehicle with a second longitudinal center axis, preferably a semitrailer, wherein the kink angle sensor arrangement can be arranged between the towing vehicle and the towed vehicle, in order to ascertain a kink angle between the towing vehicle and the towed vehicle, wherein the kink angle sensor arrangement has at least:

one connecting element with a third longitudinal center axis;

one first articulation piece on a first side of the connecting element;

one second articulation piece for connection to the towing vehicle or to the towed vehicle, wherein the first articulation piece is or can be mounted rotatably on the second articulation piece such that the first articulation piece can twist about a second axis of rotation with respect to the second articulation piece;

one first coupling piece on a second side of the connecting element;

one second coupling piece for connection to the towed vehicle when the second articulation piece is connected to the towing vehicle, or for connection to the towing vehicle when the second articulation piece is connected to the towed vehicle, wherein the first coupling piece is or can be detachably mechanically (rigidly) connected to the second coupling piece, for example is or can be detachably plugged together, in such a way that twisting of the first coupling piece with respect to the second coupling piece can be prevented; and one sensor system which is designed to detect a rotated position and/or a rotational movement of the first articulation piece about the second axis of rotation, and to generate and output a sensor signal, wherein the sensor signal characterizes the rotated position and/or the rotational movement of the first articulation piece about the second axis of rotation.

According to an embodiment of the invention, a vehicle combination comprising a towing vehicle with a first longitudinal center axis and a towed vehicle with a second longitudinal center axis, preferably a semitrailer, is also provided, wherein the towing vehicle is connected to the towed vehicle via a fifth-wheel coupling (coupling device) so that it can swivel about a first axis of rotation. The fifth-wheel coupling or coupling device is here formed by a kingpin on the towed vehicle and a fifth-wheel plate on the towing vehicle, wherein the kingpin is held in a holding region of the fifth-wheel plate or the mouth of the fifth-wheel plate so that it can swivel, and is locked therein.

A kink angle sensor arrangement is arranged between the towing vehicle and the towed vehicle, by means of which a kink angle between the towing vehicle and the towed vehicle can be ascertained, wherein the kink angle sensor arrangement has at least:

one connecting element, for example a connecting arm, with a third longitudinal center axis;

one first articulation piece on a first side of the connecting element;

one second articulation piece, wherein the first articulation piece is mounted rotatably on the second articulation piece such that the first articulation piece can twist about a second axis of rotation with respect to the second articulation piece, wherein the first axis of rotation and the second axis of rotation preferably lie parallel to each other, in particular lie one on top of the other;

one first coupling piece on a second side of the connecting element;

one second coupling piece, wherein the first coupling piece can be detachably mechanically connected to the second coupling piece, for example detachably plugged together, in particular via a plug/socket connection or a connection acting in the same way, such that twisting of the first coupling piece with respect to the second coupling piece is prevented.

It is provided here that the second articulation piece is arranged on the towed vehicle and the second coupling piece on the towing vehicle, or the second articulation piece is arranged on the towing vehicle and the second coupling piece on the towed vehicle such that the first articulation piece twists about the second axis of rotation when there is a change in the kink angle between the towing vehicle and the towed vehicle.

Also provided is a sensor system which is designed to detect a rotated position and/or a rotational movement of the first articulation piece about the second axis of rotation and to generate and output a sensor signal, wherein the sensor signal characterizes the rotated position and/or the rotational movement of the first articulation piece about the second axis of rotation, and hence also the kink angle between the towing vehicle and the towed vehicle.

According to an embodiment of the invention, a method for forming the vehicle combination according to the present disclosure is provided, wherein the connecting element of the kink angle sensor arrangement is mounted on the second articulation piece so that it can rotate via the first articulation piece such that the first articulation piece can twist about the second axis of rotation with respect to the second articulation piece, and wherein the second articulation piece is arranged on the towed vehicle and the second coupling piece is arranged on the towing vehicle, or the second articulation piece is arranged on the towing vehicle and the second coupling piece is arranged on the towed vehicle, wherein the method comprises at least the following steps:

moving the towing vehicle closer to the towed vehicle, or the other way round, in such a way that the kingpin on the towed vehicle is held by the fifth-wheel plate of the towing vehicle so that it can swivel, in particular by being held in the holding region of the mouth of the fifth-wheel plate, in order to connect the towing vehicle to the towed vehicle so that it can swivel via the fifth-wheel coupling, wherein the towing vehicle is connected, preferably automatedly, to the towed vehicle so that it can swivel via the fifth-wheel coupling;

mechanically connecting the first coupling piece to the second coupling piece such that twisting of the first coupling piece with respect to the second coupling piece is prevented and the first articulation piece twists about the second axis of rotation when there is a change in the kink angle between the towing vehicle and the towed vehicle.

The following advantages arise therefrom:

By virtue of the kink angle sensor arrangement and the correspondingly fixed attachment on one of the vehicles and the attachment via a bearing on the in each case other vehicle, the rotational movement of the towing vehicle with respect to the towed vehicle can be converted into a rotational movement between the first articulation piece and the second articulation piece. By virtue of a corresponding sensing of this rotational movement via the sensor system, the kink angle can be simply derived from simple geometric observations, in particular when the sensor system outputs an absolute angle directly or such an absolute value can be ascertained directly from the output sensor signals. In this case, offset compensation can also be omitted because an absolute value is ascertained and output which is measured from a known starting position, in particular a starting position (absolute angle=0°) when the two longitudinal center axes of the vehicles lie parallel to each other and the kink angle is also 0°.

Such a kink angle sensor arrangement can additionally be fixed automatically via the coupling pieces and consequently be brought into the correct and into a known orientation such that no manual intervention is necessary and the kink angle is available immediately without having to perform offset compensation. To do this, corresponding guide devices can be provided which, when the two vehicles are coupled to each other, ensure that the two coupling pieces automatically engage in each other and are mechanically connected to each other (irrespective of the existing kink angle or in a specified kink angle range < >0°).

Thus, if the coupling takes place at a kink angle not equal to 0°, the connecting element will, after the mechanical connection has been formed via the two coupling pieces, automatically be oriented with respect to the respective (fixedly connected) vehicle, there is always a known and also fixed spatial relationship which follows from the position and the construction of the coupling pieces. The currently existing kink angle can therefore be ascertained directly from the rotated position of the first articulation piece directly after the coupling and without any further calibration steps.

It is furthermore preferably provided that where the second articulation piece is arranged on the towed vehicle and the second coupling piece is arranged on the towing vehicle, there is a consistent spatial relationship between the first longitudinal center axis of the towing vehicle and the third longitudinal center axis of the connecting element, and where the second articulation piece is arranged on the towing vehicle and the second coupling piece is arranged on the towed vehicle, there is a consistent spatial relationship between the second longitudinal center axis of the towed vehicle and the third longitudinal center axis of the connecting element. As a result, the above described fixed orientation can be achieved in which the respective longitudinal center axes remain fixed relative to one another, as a result of which the kink angle can be derived from geometric observations.

It is furthermore preferably provided that the first articulation piece is configured in the form of a disk, in particular a circular disk, and the second articulation piece is designed as a bearing component, wherein the circular disk is mounted rotatably on the bearing component. A simple rotatable bearing arrangement can consequently be achieved, the rotation of which can be detected via the sensor system. It is preferably provided here that the kingpin at the same time forms the bearing component, wherein the circular disk bears in sliding fashion on the kingpin. As a result, use is made of the kingpin which is present anyway and which is suitable as a bearing and an axis of rotation such that there is no need for additional bearing components. In addition, ascertaining the kink angle is facilitated if the first axis of rotation lies on top of the second axis of rotation, which is generally the case with such a design.

It is furthermore preferably provided that the circular disk is configured as magnetic or ferromagnetic, in particular with magnet poles alternating over the circumference, and the sensor system is designed to contactlessly detect the magnetic or ferromagnetic action of the circular disk when the circular disk twists about the second axis of rotation, wherein the sensor system preferably has a Hall sensor for this purpose. This enables simple and contactless detection of the rotation of the circular disk which is additionally largely unaffected by the weather.

It is furthermore preferably provided that the circular disk is designed as a magnet wheel, wherein the circular disk has for this purpose, for example, teeth and gaps situated between them which are uniformly distributed in a circle, or holes uniformly distributed in a circle are introduced into the circular disk, and the sensor system is designed to detect optical radiation which is output from a radiation source of the sensor system and passes temporarily through the gaps or through the holes to an optical sensor of the sensor system when the circular disk twists about the second axis of rotation. This represents a further simple and accurate option for the contactless sensing of the rotational movement.

It is furthermore preferably provided that the circular disk interacts frictionally or in form-fitting fashion with a wheel of the sensor system in such a way that the wheel also twists when the circular disk twists about the second axis of rotation, wherein the rotation of the wheel can be detected by a speed sensor of the sensor system, and wherein the sensor signal can preferably be generated and output depending on the rotation of the wheel. Accordingly, in an appropriate environment, simple measurement of the rotational movement by contact is also provided, which can represent a favorable solution which can also be retrofitted simply.

It is furthermore preferably provided that the circular disk is connected to a spring element, wherein the spring element is tensioned or relaxed when the circular disk twists about the second axis of rotation, wherein the spring element is moreover connected to a force sensor of the sensor system such that a force acting on the spring element can be measured, and wherein the sensor signal can preferably be generated and output depending on the force acting on the spring element. Measurement of the force is accordingly also provided in order to detect the rotational movement, wherein this measurement is also largely unaffected by the weather.

It is furthermore preferably provided that the sensor signal transmits an absolute angle, wherein the absolute angle specifies the rotated position of the first articulation piece with respect to a starting position. Accordingly, an absolute angle is directly output such that there is no need to use complex conversions or additional sensor system parameters for calculating the kink angle.

It is preferably provided here that the starting position is present when the first longitudinal center axis lies parallel to the second longitudinal center axis and preferably also parallel to the third longitudinal center axis. It is thus assumed that an absolute value of 0° is output when driving in a straight line such that immediately after the coupling a kink angle is immediately available, after the coupling pieces engage with each other and ensure a fixed known spatial relationship. There is therefore no need for an additional calibration step after the coupling, which in particular simplifies automated operation.

It is furthermore preferably provided that the sensor system is connected to a control unit by signals, for example to a trailer braking control unit or to a trailer central control unit or to a semitrailer tractor central control unit such that the sensor signals can be transmitted to the control unit, wherein the control unit is designed to generate and output a kink angle signal from the sensor signals, wherein the kink angle signal transmits the kink angle. The sensor signals can therefore be processed immediately at the respective location in the vehicle and be used for automated control.

It is furthermore preferably provided that a plug-in connection, in particular a fluid-conducting plug-in connection and/or an electrical plug-in connection, is formed between the towing vehicle and the towed vehicle, wherein the plug-in connection has a first connecting part and a second connecting part, wherein the first connecting part is connected detachably to the second connecting part, wherein the kink angle sensor arrangement is arranged at least partially at the plug-in connection or integrated therein, preferably at the fluid-conducting plug-in connection and/or at the electrical plug-in connection. Accordingly, components can thus also be combined which are already intended to be connected to one another automatically in an automated operation. The first connecting part is thus situated, for example, on the towed vehicle or cabling and/or tubing fastened on the first connecting part is routed to the towed vehicle, and the second connecting part is situated, for example, on the towing vehicle or cabling and/or tubing fastened on the second connecting part is routed to the towing vehicle.

It can here preferably be provided that, where the second coupling piece is arranged on the towing vehicle:

- the first connecting part of the plug-in connection is combined with or connected to the first coupling piece of the kink angle sensor arrangement and/or
- the second connecting part of the plug-in connection is combined with or connected to the second coupling piece of the kink angle sensor arrangement. Where the second coupling piece is arranged on the towed vehicle, it is provided that:
- the first connecting part of the plug-in connection is combined with or connected to the second coupling piece of the kink angle sensor arrangement and/or
- the second connecting part of the plug-in connection is combined with or connected to the first coupling piece of the kink angle sensor arrangement.

As a result, the coupling of the kink angle sensor arrangement to the respective vehicle can be combined with the formation of the plug-in connection (in a fluid-conducting fashion and/or electrically) such that no separate procedures are necessary for this. In addition, only one device for automatically coupling the plug is then necessary. As soon as the plug-in connection is then formed, energy and/or signal transmission is then also ensured, in particular when the sensor signals of the sensor system are transmitted via the electrical plug-in connection. The kink angle sensor arrangement is thus immediately functional when the plug-in connection is formed.

It is furthermore preferably provided that cabling and/or tubing which is routed to the first connecting part of the plug-in connection or to the second connecting part of the plug-in connection depending on with which connecting part the first coupling piece is combined at the connecting element, is fixed on the connecting element of the kink angle sensor arrangement or is routed along the connecting element of the kink angle sensor arrangement or is integrated into the connecting element of the kink angle sensor arrangement. Accordingly, not only can the connecting elements be combined or connected to each other but also the cabling and/or tubing can be combined. As a result, the coupling and the routing of the cabling and/or tubing to the respective vehicle can be simplified without using additional elements.

It is furthermore preferably provided that the first coupling piece is automatically connected to the second coupling piece whilst or after the towing vehicle is being or has been coupled to the towed vehicle via the fifth-wheel coupling, preferably at the same time as the plug-in connection is formed by plugging the first connecting part together with the second connecting part, in particular when the respective coupling piece of the kink angle sensor arrangement is, as described, combined with or connected to the respective connecting part of the plug-in connection. This enables simple automated operation in just one combined plug-in procedure.

It is furthermore preferably provided that the connecting arm of the kink angle sensor arrangement is automatically oriented when the towing vehicle is moved closer to the towed vehicle, or the other way round, in such a way that

- the third longitudinal center axis of the connecting element is oriented parallel to the first longitudinal center axis of the towing vehicle when the second articulation piece is arranged on the towed vehicle and the second coupling piece is arranged on the towing vehicle, and
- the third longitudinal center axis of the connecting element is oriented parallel to the second longitudinal center axis of the towed vehicle when the second articulation piece is arranged on the towing vehicle and the second coupling piece is arranged on the towed vehicle. As a result, no further adjustment or orientation is necessary and a known spatial relationship is set immediately which facilitates ascertainment of the rotated position or the kink angle.

According to an embodiment of the invention, a kink angle sensor arrangement for a vehicle combination consisting of a towing vehicle with a first longitudinal center axis and a towed vehicle with a second longitudinal center axis, preferably a semitrailer, is furthermore provided, wherein the kink angle sensor arrangement can be arranged between the towing vehicle and the towed vehicle in order to ascertain a kink angle between the towing vehicle and the towed vehicle, wherein the kink angle sensor arrangement has at least:

- one connecting element with a third longitudinal center axis;
- one first articulation piece on a first side of the connecting element;
- one second articulation piece for connection to the towing vehicle or to the towed vehicle, wherein the first articulation piece is mounted rotatably on the second articulation piece such that the first articulation piece can twist about a second axis of rotation with respect to the second articulation piece;
- one first coupling piece on a second side of the connecting element;

one second coupling piece for connection to the towed vehicle, when the second articulation piece is connected to the towing vehicle, or for connection to the towing vehicle when the second articulation piece is connected to the towed vehicle, wherein the first coupling piece can be detachably mechanically connected to the second coupling piece, for example detachably plugged together, such that twisting of the first coupling piece with respect to the second coupling piece can be prevented; and one sensor system which is designed to detect a rotated position and/or a rotational movement of the first articulation piece about the second axis of rotation, and to generate and output a sensor signal, wherein the sensor signal characterizes the rotated position and/or the rotational movement of the first articulation piece about the second axis of rotation.

It is preferably provided that a plug-in connection, in particular a fluid-conducting plug-in connection and/or an electrical plug-in connection which is or can be formed between the towing vehicle and the towed vehicle, is arranged at least partially at the kink angle sensor arrangement or is integrated into the latter, wherein the plug-in connection has a first connecting part and a second connecting part, wherein the first connecting part is or can be connected detachably to the second connecting part. This constitutes a preferred combined formation which enables simplified automated coupling as described. For this purpose, it is in particular provided, depending on to which vehicle the second coupling piece is fastened, that the first connecting part of the plug-in connection is combined with or connected to the first coupling piece of the kink angle sensor arrangement, and/or the second connecting part of the plug-in connection is combined with or connected to the second coupling piece of the kink angle sensor arrangement, or that the first connecting part of the plug-in connection is combined with or connected to the second coupling piece of the kink angle sensor arrangement and/or the second connecting part of the plug-in connection is combined with or connected to the first coupling piece of the kink angle sensor arrangement.

FIG. 1 shows a vehicle combination 100 consisting of a towing vehicle 1, for example a semitrailer tractor 1*a* or a dolly, and a towed vehicle 2, for example a semitrailer 2*a*. The towing vehicle 1 is connected to the towed vehicle 2 via a fifth-wheel coupling 3 (coupling device) which consists of a fifth-wheel plate 3*a* on the towing vehicle 1 and a kingpin 3*b* on the towed vehicle 2. The kingpin 3*b* is held in a fifth-wheel plate mouth 3*c* in the fifth-wheel plate 3*a* so that it can swivel and is secured therein via a locking mechanism. As a result, the towed vehicle 2 can twist with respect to the towing vehicle 1, as is generally known, about a first axis of rotation D1, wherein the first axis of rotation D1 runs, in the coupled state, through the kingpin 3*b* and a holding region 3*d* of the fifth-wheel plate mouth 3*c* in which the kingpin 3*b* is held in the locked state.

Figure 2:
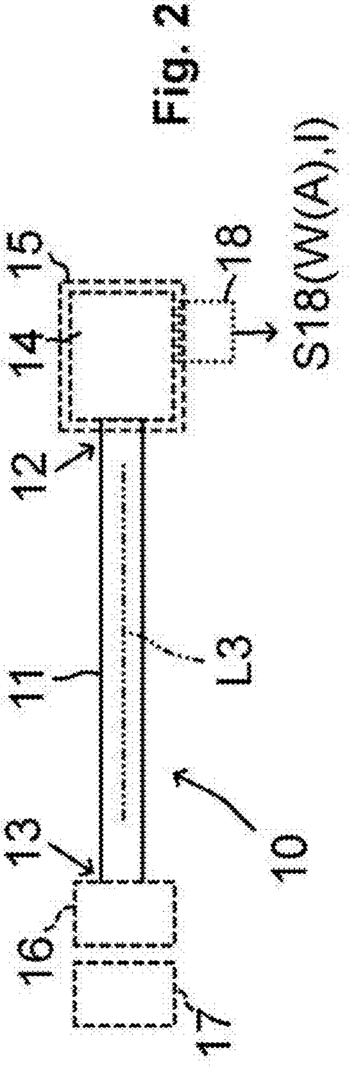
FIG. 2 shows a schematic view of a kink angle sensor arrangement.

In the case of such a vehicle combination 100, in order to ascertain a kink angle K which is measured between a first longitudinal center axis L1 of the towing vehicle 1 and a longitudinal center axis L2 of the towed vehicle 2, a kink angle sensor arrangement 10 illustrated in schematic form in FIG. 2 is provided. This has a connecting element 11 which is preferably configured as rigid, with a first side 12 and a second side 13. Fixed on the first side 12 is a first articulation piece 14 which is held rotatably by a second articulation piece 15. Fixed on the second side 13 is a first coupling piece 16 which can be fixedly connected to a second coupling piece 17.

A sensor system 18 is furthermore provided which is designed to detect by the use of sensors a rotational movement or a rotated position of the first articulation piece 14 connected to the connecting element 11 and to output the sensor signal S18 characterizing the rotational movement or the rotated position. For this purpose, the sensor system 18 can, in the case of an implemented evaluation unit, for example, directly ascertain an absolute angle W corresponding to the rotated position of the first articulation piece 14 and output it via the sensor signal S18. The absolute angle W then corresponds to the rotated position or angular position of the first articulation piece 14 with respect to a fixed normal position.

If there is no evaluation unit implemented in the sensor system 18, in the case of an incremental encoder as a constituent part of the sensor system 18, the individually detected pulses I which are detected by the incremental encoder when the first articulation piece 14 rotates can, for example, be output, correspondingly encoded, via the sensor signal S18. The absolute angle W can then subsequently be derived from the number of output and transmitted pulses I, knowing the number of pulses I per complete revolution.

The output sensor signals S18 can be further processed in a control unit 20, i.e. correspondingly interpreted or evaluated, for example converted into an actual kink angle K between the first longitudinal center axis L1 and the second longitudinal center axis L2. Depending on the arrangement of the sensor system 18, for example on the towed vehicle 2, the control unit 20 can be a trailer braking control unit 20*a* or a trailer central control unit 20*b*. This control unit 20 can then transmit interpreted kink angle signals SK which include in particular the kink angle K to a semitrailer tractor central control unit 21 in the semitrailer tractor 1*a*, for example via a trailer CAN bus or an automotive Ethernet connection.

The semitrailer tractor central control unit 21 can then use the interpreted kink angle signals SK for further processing, for example in order to ascertain or to verify a target trajectory for the vehicle combination 100 and to autonomously control the vehicle combination 100 depending on the target trajectory. If the sensor system 18 is arranged on the towing vehicle 1, in particular on the semitrailer tractor 1*a*, the control unit 20 can be the semitrailer tractor central control unit 21 or be a unit integrated therein which then ascertains and further processes the interpreted kink angle signals SK, for example for the target trajectory, in order to correspondingly autonomously control the vehicle combination 100.

Figure 3:
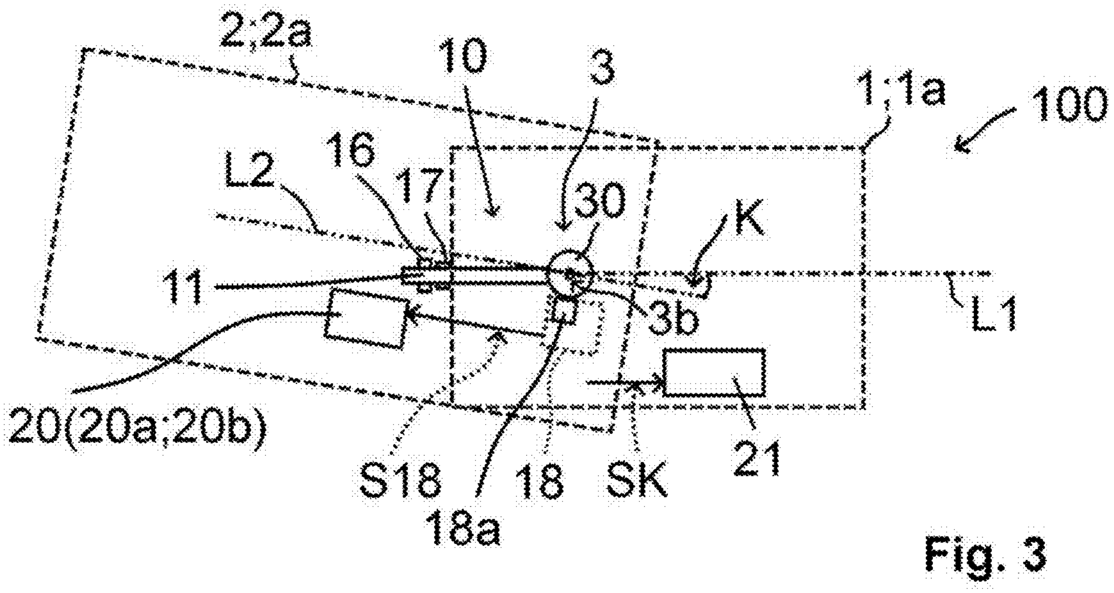
FIG. 3 shows a schematic view of the kink angle sensor arrangement on the vehicle combination when driving around a bend.

A plurality of embodiments, which are described by way of example below, are provided for the attachment of the kink angle sensor arrangement 10 to the vehicle combination 100:

In the embodiment illustrated in FIG. 3, the first articulation piece 14 is formed by a circular disk 30 which is rigidly connected to the first side 12 of the connecting element 11 and has a central bore. The circular disk 30 is placed over the kingpin 3*b* such that the latter projects through the central bore. A bearing component 32 fastened on the towed vehicle 2 (see FIG. 1), for example a plain bearing or rolling bearing, then serves as a second articulation piece 15, wherein the circular disk 30 is guided or mounted rotatably in the bearing component 32. The kingpin 3*b* can here be a component of the bearing component 32, i.e. the circular disk 30 also bears with the central bore, for example, in sliding fashion on the kingpin 3*b*. The bearing component 32 thus ensures as a whole that the circular disk 30 can twist about a second axis of rotation D2 which coincides with the first axis of rotation D1 in this embodiment.

In alternative embodiments, it can be provided that the circular disk 30 is mounted in a bearing component 32 on the towed vehicle 2 which is arranged off-center with respect to the first axis of rotation D1. The circular disk 30 is then not placed over the kingpin 3*b* and instead is mounted offset thereto in the bearing component 32 such that the first axis of rotation D1 in the kingpin 3*b* and the second axis of rotation D2 of the circular disk 30 no longer coincide, in particular the second axis of rotation D2 does not run through the kingpin 3*b*.

The first coupling piece 16 on the second side 13 of the connecting element 11 is configured, for example, as a plug or as a socket and the second coupling piece 17 is configured as the corresponding counter piece, i.e. as a socket or plug. The two coupling pieces 16, 17 can be mechanically detachably connected to each other, i.e. the first and second coupling piece 16, 17 are configured as a plug/socket combination, wherein other types of connection are also provided. The second coupling piece 17 is here arranged fixedly or rigidly on the towing vehicle 1 such that the connecting element 11 is likewise fixedly or rigidly connected to the towing vehicle 1 via the second side 13 by the plug/socket combination.

In the case of such an arrangement, the connecting element 11 always has, when the plug/socket combination is formed, a fixed or consistent spatial relationship with respect to the first longitudinal center axis L1 of the towing vehicle 1 and modifies its spatial relationship with respect to the second longitudinal center axis L2 of the towed vehicle 2 as soon as the towed vehicle 2 twists relative to the towing vehicle 1 about the first axis of rotation D1 in the kingpin 3*b* or the kink angle K between the two longitudinal center axes L1, L2 changes. This changing spatial relationship between the connecting element 11 and the second longitudinal center axis L2 simultaneously effects a rotational movement of the first articulation piece 14 with respect to the second articulation piece 15 (bearing component 32) such that the kink angle K can be deduced from this rotational movement.

The rotational movement of the first articulation piece 14 can be detected via the sensor system 18 which is situated on the towed vehicle 2 in this embodiment. The sensor system 18 can have for this purpose, for example, a Hall sensor 18*a* which is situated adjacent to the circular disk 30 but is not in contact with the latter, for example above the circular disk 30 or at one end side of the circular disk 30. The Hall sensor 18*a* can for this purpose, for example, be fastened in a protected fashion on an underside 2*b* of the towed vehicle 2, preferably off-center with respect to the first axis of rotation D, and consequently be positioned adjacent to the circular disk 30. The circular disk 30 is configured as magnetic or ferromagnetic with magnet poles (N, S) alternating over the circumference, and the Hall sensor 18*a* is spaced apart from the circular disk 30 in such a way that the magnetic or ferromagnetic effect, which is modified in the case of twisting, of the adjacent circular disk 30 can be detected by the Hall sensor 18*a*.

The sensor system 18 then, based on the measured values of the Hall sensor 18*a* which are dependent on the rotational movement between the circular disk 30 and the Hall sensor 18*a*, outputs a corresponding sensor signal S18 which characterizes this rotational movement or a current rotated position of the circular disk 30 about the second axis of rotation D2. Depending on the structure of the sensor system 18, the sensor signal S18 can, for example, directly transmit an absolute angle W by which the circular disk 30 has twisted about the second axis of rotation D2 with respect to a starting position A (zero position). Or the sensor signal S18 outputs, correspondingly encoded, the pulses I which are measured by the Hall sensor 18*a* and result from the changing magnet poles, and from which the absolute angle W can be derived.

In this way, a kink angle signal SK which includes or specifies the kink angle K can be generated and output for further use, based on the sensor signal S18 as described above after corresponding interpretation or evaluation in the control unit 20. The kink angle K results, irrespective of whether the first axis of rotation D1 and the second axis of rotation D2 coincide, directly from the absolute angle W by geometric observations because the circular disk 30 is fixedly connected to the connecting element 11 which in turn has a fixed spatial relationship with respect to the first longitudinal center axis L1.

In order to simplify the geometric observation when ascertaining the kink angle K, the connecting element 11 or a third longitudinal center axis L3 (see FIG. 2) which is defined by the connecting element 11 is oriented parallel to the first longitudinal center axis L1. The starting position A on the basis of which the absolute angle W is ascertained is preferably present in this angular position. The absolute angle W ascertained and output by the sensor system 18 in the simplest case thus directly specifies the kink angle W. In order to achieve such an orientation of the connecting element 11, the connecting element 11 can be guided, for example, over a contour of the fifth-wheel plate 3*a*, for example between the jaws 3*e* of the fifth-wheel plate mouth 3*c*, when the towing vehicle 1 is coupled to the towed vehicle 2. When the two vehicles 1, 2 are coupled, the connecting element 11 then rotates automatically from its current angular position, which is dependent on the orientation of the towed vehicle 2, into the starting position A, i.e. with L1 parallel to L3. This then also simplifies the plugging together of the two coupling pieces 16, 17, which can preferably likewise take place automatically, such that a kink angle K can be detected immediately after (automated) coupling of the two vehicles 1, 2 because a defined starting position A is present.

Figure 4:
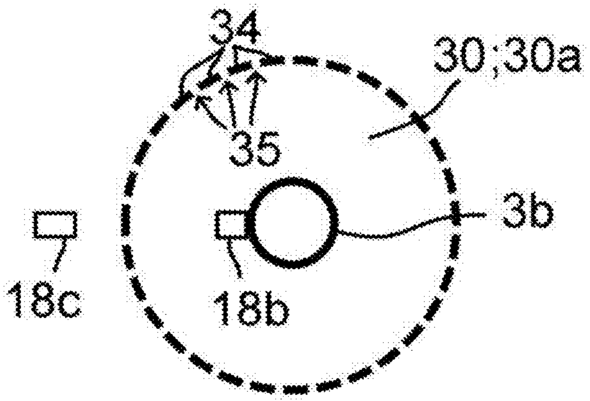
FIGS. 4-7 show sensor systems and the first articulation piece of the kink angle sensor arrangement.
Figure 5:
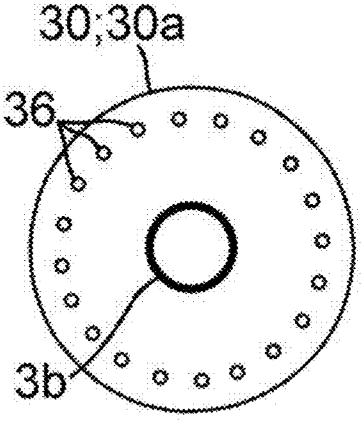

As an alternative to magnetic measurement via the Hall sensor 18*a*, optical measurement can also be provided, wherein the circular disk 30 has, in the configuration as a magnet wheel 30, teeth 34 which are distributed uniformly over the whole circumference and gaps 35 situated between them (see FIG. 4) or holes 36 distributed uniformly over the whole circumference (see FIG. 5). The gaps 35 or the holes 36 ensure, when the circular disk 30 rotates about the second axis of rotation D2, that optical radiation output from a radiation source 18*b* (for example, a laser) is temporarily allowed to pass through to an optical sensor 18*c*. The radiation source 18*b* and the optical sensor 18*c* are in that case likewise arranged in protected fashion on the underside 2*b* of the towed vehicle 2, in a corresponding orientation with respect to the teeth 34/gaps 35 or holes 36.

The sensor system 18 then, based on the measured values of the optical sensor 18*c* which are dependent on the rotational movement between the circular disk 30 and the optical sensor 18*c*, outputs a corresponding sensor signal S18 which characterizes this rotational movement or a current rotated position of the circular disk 30 about the second axis of rotation D2. Also, in this embodiment either the absolute angle W or the pulses I which result from the optical radiation which is temporarily allowed to pass through can here be transmitted via the sensor signal S18. In this way, a kink angle signal SK which includes or specifies the kink angle K can also be generated and output for further use, based on the sensor signal S18 as described above after corresponding interpretation or evaluation in the control unit 20.

Figure 6:
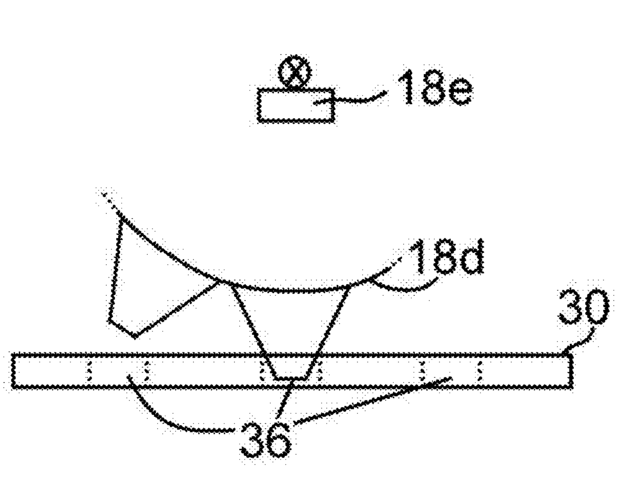

In a further embodiment, a sensor system 18 with a contact measurement method is provided in which the circular disk 30 interacts frictionally or in form-fitting fashion with a wheel 18*d*. Holes 36 (or notches) can, for example, for this purpose and as illustrated schematically in FIG. 6, be arranged in the circular disk 30 distributed over the circumference. A wheel 18*d* with teeth (toothed wheel), the rotation of which is measured by a speed sensor 18*e* for example in the axle of the wheel 18*d*, engages in these holes 36 from above. As soon as the circular disk 30 rotates when the kink angle K is modified, the toothed wheel is driven, this being measured via the speed sensor 18*e*. A wheel 18*d*, which bears frictionally on the circular disk 30 and the rotation of which is measured by the speed sensor 18*e*, can also be used instead of the toothed wheel. The toothed wheel can also mesh with teeth at the end side of the circular disk 30 and thereby be driven by the circular disk 30. The respective wheel 18*d* and the speed sensor 18*e* are then arranged in a protected fashion on the underside 2*b* of the towed vehicle 2.

The sensor system 18 then, based on the measured values of the speed sensor 18*e* which are dependent on the rotational movement of the circular disk 30, outputs a corresponding sensor signal S18 which characterizes this rotational movement or a current rotated position of the circular disk 30 about the second axis of rotation D2. In this embodiment, the absolute angle W is here preferably transmitted via the sensor signal S18. In this way, a kink angle signal SK which includes or specifies the kink angle K can also be generated and output for further use, based on the sensor signal S18 as described above after corresponding interpretation or evaluation in the control unit 20.

Figure 7:
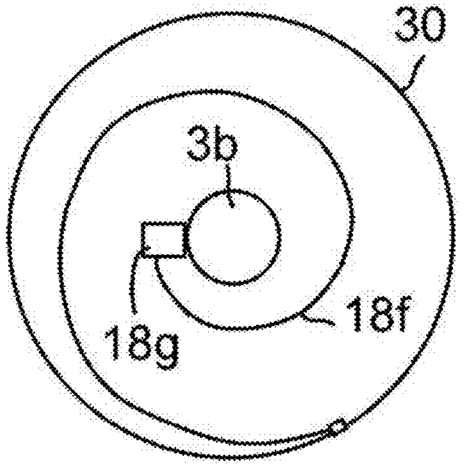

A further concept for the sensor system 18 provides that a spring element 18*f* is connected, for example at the edge, to the circular disk 30, wherein the spring element 18*f* is tensioned or relaxed, depending on the direction of rotation, when the circular disk 30 twists. The spring element 18*f* can be a restoring spring or a torsion/spiral spring (see FIG. 7). The spring element 18*f* is furthermore connected to a force sensor 18*g* which is arranged, for example, on the underside 2*b* of the towing vehicle 2 and measures the force which acts on the spring element 18*f*. The sensor system 18 then, based on the measured values of the force sensor 18*g* which are dependent on the rotational movement of the circular disk 30, outputs a corresponding sensor signal S18 which characterizes this rotational movement or a current rotated position of the circular disk 30 about the second axis of rotation D2. In this embodiment, the absolute angle W is here preferably transmitted via the sensor signal S18. In this way, a kink angle signal SK which includes or specifies the kink angle K can also be generated and output for further use, based on the sensor signal S18 as described above after corresponding interpretation or evaluation in the control unit 20.

Figure 8:
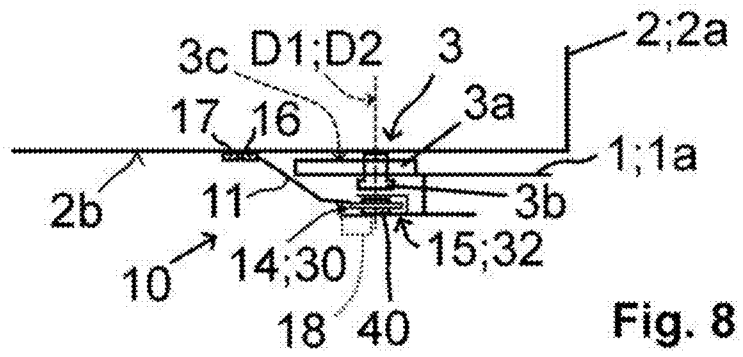
FIG. 8 shows an alternative arrangement of the kink angle sensor arrangement on the vehicle combination.

In further embodiments, it is provided that the towing vehicle 1 and the towed vehicle 2 are swapped when the kink angle sensor arrangement 10 is attached, as illustrated by way of example in FIG. 8. Accordingly, the first articulation piece 14 is mounted or rotatably held on the connecting element 11 in a second articulation piece 15 on the towing vehicle 1, and the first coupling piece 16 is fixedly coupled to a second coupling piece 17 on the towed vehicle 2, for example via a plug/socket combination as in the preceding exemplary embodiments.

In the case of such an arrangement, the connecting element 11 always has, when the plug/socket combination is formed, a fixed or consistent spatial relationship with respect to the second longitudinal center axis L2 of the towed vehicle 2 and modifies its spatial relationship with respect to the first longitudinal center axis L1 of the towing vehicle 1 as soon as the towed vehicle 2 twists relative to the towing vehicle 1 about the first axis of rotation D1 in the kingpin 3*b* or the kink angle K between the two longitudinal center axes L1, L2 changes. This changing spatial relationship between the connecting element 11 and the first longitudinal center axis L1 simultaneously effects a rotational movement of the first articulation piece 14 with respect to the second articulation piece 15 such that the kink angle K can be deduced from this rotational movement.

The rotatable connection between the two articulation pieces 14, 15 can in this embodiment preferably likewise be situated in the first axis of rotation D1, i.e. the second axis of rotation D2 about which the first articulation piece 14 rotates lies on top of the first axis of rotation D1. The second axis of rotation D2 can for this purpose take the form, for example, of a bolt 40 which is fastened on the fifth-wheel plate 3*a* on the towing vehicle 1 and is placed onto the circular disk 30 as a first articulation piece 14 with its central bore in sliding fashion, cf FIG. 8. The bolt 40 is here a constituent part of a bearing component 32 (a second articulation piece 15) which can have additional guide means for guiding the circular disk 30 when it rotates. If the bolt 40 is situated, coaxially with the kingpin 3*a*, below the fifth-wheel plate mouth 3*c*, the first axis of rotation D1 lies on the second axis of rotation D2. The second axis of rotation D2 can, however, also be arranged offset with respect to the first axis of rotation D1, for example by a corresponding displacement of the bolt 40 with respect to the kingpin 3*b*.

In a further embodiment, instead of being arranged on an additional bolt 40, the circular disk 30 can also be arranged on the kingpin 3*b* (second articulation piece 15) itself, for example below the fifth-wheel plate mouth 3*c*, when the kingpin 3*b* is held in the locked state in the fifth-wheel plate mouth 3*c*. The circular disk 30 then thus always rotates together with the kingpin 3*b* and likewise D1=D2.

The rotational movement of the first articulation piece 14 or the circular disk 30 can be detected via the sensor system 18 which is situated on the towing vehicle 1 in this embodiment. The configuration of the sensor system 18 is comparable to that of the sensor system 18 in the preceding embodiments. Accordingly, magnetic measurement via a Hall sensor 18*a*, optical measurement via a light source 18*b* and an optical sensor 18*c*, contact measurement via a wheel/toothed wheel 18*d* and a speed sensor 18*e*, or force measurement via a spring element 18*f* and a force sensor 18*g* can take place. The circular disk 30 is then designed correspondingly as in the preceding embodiments. The principle of the above described sensor system 18 can therefore also correspondingly be applied in these embodiments. The starting position A is, however, here a different one, wherein the third longitudinal center axis L3 of the connecting element 11 is preferably oriented parallel to the second longitudinal center axis L2 of the towed vehicle 2 when the vehicles 1, 2 are coupled to each other. This orientation preferably takes place automatically, for example by a corresponding guide on the towed vehicle 2 when the two vehicles 1, 2 are coupled (automatedly) to each other. As a result, the geometric observation when ascertaining the kink angle K from the measured absolute angle W can also be simplified and, after the coupling, such a kink angle K is directly available.

Figure 9:
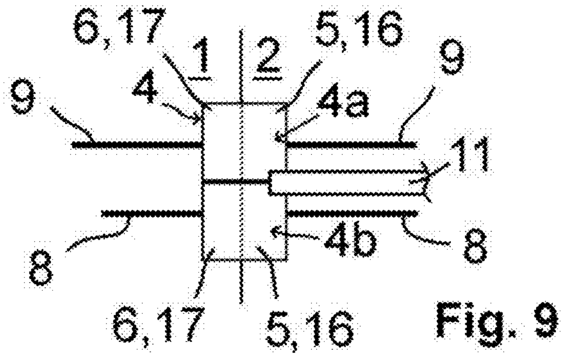
FIG. 9 shows a detailed view of a plug-in connection between parts of the vehicle combination.

According to FIG. 9, the kink angle sensor arrangement 10 can in every described embodiment be integrated at least partially into a plug-in connection 4 which is formed between the towing vehicle 1 and the towed vehicle 2. The plug-in connection 4 here comprises at least one fluid-conducting plug-in connection 4*a* (pneumatically/hydraulically) for transmitting a brake pressure and/or a supply pressure between the individual vehicles 1, 2, and/or at least one electrical plug-in connection 4*b* for transmitting any desired electrical signals. The plug-in connection 4; 4*a*, 4*b* here consists in each case of two parts, a first connecting part 5 (for example, a plug or socket) on the towed vehicle 2 and a second connecting part 6 (for example, a socket or plug) on the towing vehicle 1, wherein the first connecting part 5 can be connected detachably to the second connecting part 6 in order to form the fluid-conducting and/or electrical connection between the vehicles 1, 2. The compressed-air plug-in connection 4*a* and/or the electrical plug-in connection 4*b* can here be plugged in preferably automatedly via a plug-in actuation device 7, for example a linear actuator, such that fully automated coupling between the two vehicles 1, 2 is enabled.

The kink angle sensor arrangement 10 can be integrated into such a plug-in connection 4; 4*a*, 4*b* as follows:

In the case of an arrangement of the first coupling piece 16 on the towed vehicle 2 (via the articulated connection) and of the second coupling piece 17 on the towing vehicle 1 (cf FIG. 1), the first connecting part 5 on the towed vehicle 2 can be combined (joined integrally) with the first coupling piece 16, and the second connecting part 6 on the towing vehicle 1 with the second coupling piece 17. Conversely, in the case of an arrangement of the first coupling piece 16 on the towing vehicle 1 and of the second coupling piece 17 on the towed vehicle 2 (cf FIG. 8), the first connecting part 5 on the towed vehicle 2 can be combined (joined integrally) with the second coupling piece 17, and the second connecting part 6 on the towing vehicle 1 with the first coupling piece 16.

This makes it possible for the spatial relationship of the respective connecting element 11 with respect to the longitudinal center axis L1, L2 of the respective vehicle 1, 2 to be fixed at the same time as the fluid-conducting and/or electrical connection is formed between the two vehicles 1, 2 by the respective connecting parts 5, 6 of the plug-in connection 4, 4*a*, 4*b* being plugged together. There is therefore no need for a further connecting step and use can be made of the same plug-in actuation device 7 as for the plug connector 4; 4*a*, 4*b*.

At the same time, the sensor system 18 is then also positioned after the automated plugging-in and in some circumstances the supply of energy to the sensor system 18 is also ensured if this takes place via the electrical plug-in connection 4*b*. The sensor signal S18 and/or the interpreted kink angle signal SK can furthermore be transmitted directly to the control unit 20 or semitrailer tractor central control unit 21 via the electrical plug-in connection 4*b*. After the plug-in connection 4 has been formed automatedly, transmission of the kink angle signals SK is thus also enabled automatically.

It can furthermore be provided that the respective (electrical) cabling 8 and/or (fluid-conducting) tubing 9, which leads to that connecting part 5, 6 which is combined with the first coupling piece 16 on the connecting element 11 is fixed or routed on the connecting element 11 or is integrated into the connecting element 11.

While subject matter of the present disclosure has been illustrated and described in detail in the drawings and foregoing description, such illustration and description are to be considered illustrative or exemplary and not restrictive. Any statement made herein characterizing the invention is also to be considered illustrative or exemplary and not restrictive as the invention is defined by the claims. It will be understood that changes and modifications may be made, by those of ordinary skill in the art, within the scope of the following claims, which may include any combination of features from different embodiments described above.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

REFERENCE SIGNS (PART OF THE DESCRIPTION)

1 towing vehicle
1*a* semitrailer tractor
2 towed vehicle
2*a* semitrailer
2*b* underside of the towed vehicle 2
3 fifth-wheel coupling
3*a* fifth-wheel plate
3*b* kingpin
3*c* fifth-wheel plate mouth
3*d* holding region
3*e* jaws of the fifth-wheel plate mouth 3*c*
4 plug-in connection
4*a* fluid-conducting plug-in connection
4*b* electrical plug-in connection
5 first connecting part of the plug-in connection 4
6 second connecting part of the plug-in connection 4
7 plug-in actuation device
8 cabling
9 tubing
10 kink angle sensor arrangement
11 connecting element
12 first side of the connecting element
12 second side of the connecting element
14 first articulation piece
15 second articulation piece
16 first coupling piece
17 second coupling piece
18 sensor system
18*a* Hall sensor
18*b* light source

18*c* optical sensor
18*d* wheel
18*e* speed sensor
18*f* spring element
18*g* force sensor
20 control unit
20*a* trailer braking control unit
20*b* trailer central control unit
21 semitrailer tractor central control unit
30 circular disk
30*a* magnet wheel
32 bearing component
34 teeth on the magnet wheel 30*a*
35 gaps between the teeth 34
36 holes in the magnet wheel 30*a*
40 bolt
100 vehicle combination
A starting position
D axis of rotation
I pulse
K kink angle
L1 first longitudinal center axis of the towing vehicle 1
L2 second longitudinal center axis of the towed vehicle 2
S18 sensor signal
SK kink angle signal
W absolute angle

The invention claimed is:

1. A kink angle sensor arrangement for a vehicle combination including a towing vehicle with a first longitudinal center axis and a towed vehicle with a second longitudinal center axis, wherein the kink angle sensor arrangement can be arranged between the towing vehicle and the towed vehicle, in order to ascertain a kink angle between the towing vehicle and the towed vehicle, the kink angle sensor arrangement comprising:

a connecting element with a third longitudinal center axis;

a first articulation piece on a first side of the connecting element;

a second articulation piece for connection to the towing vehicle or to the towed vehicle, wherein the first articulation piece is configured to be mounted rotatably on the second articulation piece such that the first articulation piece can twist about a second axis of rotation with respect to the second articulation piece;

a first coupling piece on a second side of the connecting element;

a second coupling piece configured to connect to the towed vehicle when the second articulation piece is connected to the towing vehicle, or to connect to the towing vehicle when the second articulation piece is connected to the towed vehicle, wherein the first coupling piece is configured to be detachably mechanically connected to the second coupling piece, such that twisting of the first coupling piece with respect to the second coupling piece is prevented; and a sensor system which is configured to detect a rotated position and/or a rotational movement of the first articulation piece about the second axis of rotation, and to generate and output a sensor signal, wherein the sensor signal characterizes the rotated position and/or the rotational movement of the first articulation piece about the second axis of rotation.

2. The kink angle sensor arrangement as claimed in claim 1, wherein a plug-in connection including a fluid-conducting plug-in connection and/or an electrical plug-in connection, which is configured to be formed between the towing vehicle and the towed vehicle, is arranged at least partially in the kink angle sensor arrangement or integrated therein, wherein the plug-in connection has a first connecting part and a second connecting part, and wherein the first connecting part is configured to be connected to the second connecting part.

3. The kink angle sensor arrangement as claimed in claim 2, wherein: the first connecting part of the plug-in connection is combined with or connected to the first coupling piece of the kink angle sensor arrangement and/or the second connecting part of the plug-in connection is combined with or connected to the second coupling piece of the kink angle sensor arrangement, or wherein:

the first connecting part of the plug-in connection is combined with or connected to the second coupling piece of the kink angle sensor arrangement and/or the second connecting part of the plug-in connection is combined with or connected to the first coupling piece of the kink angle sensor arrangement.

4. The kink angle sensor arrangement as claimed in claim 2, wherein the sensor signals of the sensor system are configured to be transmitted via the electrical plug-in connection.

5. The kink angle sensor arrangement as claimed in claim 1, wherein the first articulation piece is configured in the form of a circular disk, and the second articulation piece is configured as a bearing component, and wherein the circular disk is mounted rotatably on the bearing component.

6. The kink angle sensor arrangement as claimed in claim 5, wherein the circular disk is configured as magnetic or ferromagnetic and the sensor system is configured to contactlessly detect a magnetic or ferromagnetic action of the circular disk when the circular disk twists about the second axis of rotation.

7. The kink angle sensor arrangement as claimed in claim 5, wherein the circular disk is configured as a magnet wheel, wherein the circular disk has teeth and gaps situated therebetween which are uniformly distributed in a circle, or wherein holes uniformly distributed in a circle are introduced into the circular disk, and the sensor system is configured to detect optical radiation which is output from a radiation source of the sensor system and passes temporarily through the gaps or through the holes to an optical sensor of the sensor system when the circular disk twists about the second axis of rotation.

8. The kink angle sensor arrangement as claimed in claim 5, wherein the circular disk interacts frictionally or in form-fitting fashion with a wheel of the sensor system such that the wheel also twists when the circular disk twists about the second axis of rotation, wherein rotation of the wheel is configured to be detected by a speed sensor of the sensor system.

9. The kink angle sensor arrangement as claimed in claim 5, wherein the circular disk is connected to a spring element, wherein the spring element is tensioned or relaxed when the circular disk twists about the second axis of rotation, and wherein the spring element is connected to a force sensor of the sensor system such that a force acting on the spring element can be measured.

10. The kink angle sensor arrangement as claimed in claim 1, wherein the sensor signal transmits an absolute angle, and wherein the absolute angle specifies the rotated position of the first articulation piece with respect to a starting position.

11. The kink angle sensor arrangement as claimed in claim 10, wherein the starting position is present when the first longitudinal center axis lies parallel to the second longitudinal center axis and preferably also parallel to the third longitudinal center axis.

* * * * *